United States Patent

[11] 3,548,956

| [72] | Inventor | Eli Hochstetler<br>Star Rte., Millersburg, Ohio 44654 |
|---|---|---|
| [21] | Appl. No. | 793,672 |
| [22] | Filed | Jan. 24, 1969 |
| [45] | Patented | Dec. 22, 1970 |

[54] SCRAPER ATTACHMENT FOR GARDEN TRACTORS
10 Claims, 7 Drawing Figs.

[52] U.S. Cl. ..................................................... 172/801, 172/668
[51] Int. Cl. ..................................................... E02f 3/76, A01b 65/00
[50] Field of Search ........................................... 172/801, 276, 803, 807, 808, 743, 668, 734, 736, 694, 272, 273; 37/117.5, 42, 44

[56] References Cited
UNITED STATES PATENTS

| 1,776,788 | 9/1930 | Gettelman ..................... | 37/42 |
| 3,010,230 | 11/1961 | Zebko ........................... | 37/42 |
| 3,199,236 | 8/1965 | Bartel et al. ................... | 172/806 |
| 3,436,847 | 4/1969 | Grimes ......................... | 172/276X |

Primary Examiner—Robert E. Pulfrey
Assistant Examiner—Stephen C. Pellegrino
Attorney—Brady, O'Boyle & Gates ABSTRACT: A simplified and economical scraper attachment for garden-type tractors which utilizes the existing lifting mechanism of the tractor and requires the manipulation of only a single bolt or pin for mounting or demounting the entire attachment. The attachment may embody twin-scraper blades for cleaning the manure pits in poultry houses or a single road-scraper blade.

INVENTOR
ELI HOCHSTETLER

BY *Brady, O'Boyle & Gates*

ATTORNEYS

SCRAPER ATTACHMENT FOR GARDEN TRACTORS

The principal objective of the invention is to provide an extremely simplified scraper attachment or mechanism which is adaptable to a number of well-known makes of garden tractors. The attachment makes use of the existing frame structure of these tractors for quick coupling and uncoupling the scraper attachment with substantially no manual effort. A single bolt or pin connects the operating link of the scraper attachment to the existing mechanical implement lift handle on the tractor. The overall construction is essentially unitary and very sturdy. One embodiment of the invention is particularly adapted for scraping or cleaning manure pits of poultry cage houses and a second embodiment is suitable for use as a snow plow or road scraper of general utility.

Various tractor-mounted scrapers are known in the prior art but in general these devices are too complex and costly to satisfy the needs of the present invention, where a single operator can drive the garden tractor into coupling relationship with the attachment and connect the attachment to the tractor lift handle by means of a single-coupling pin beneath the driver's seat.

Other features and advantages of the invention will be clearly understood during the course of the following specification.

DESCRIPTION OF THE PREFERRED EMBODIMENTS

Figure 1:
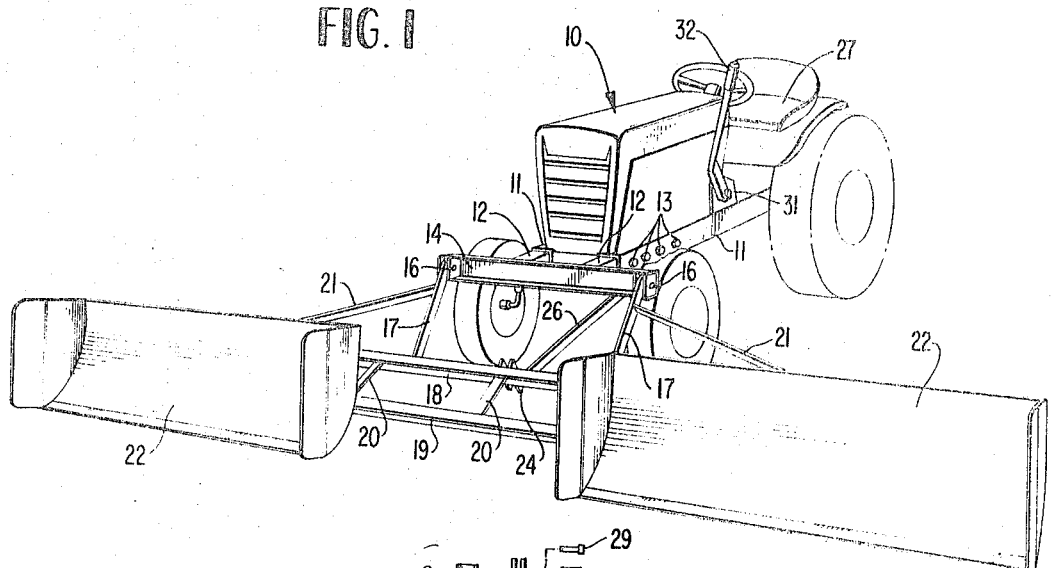
FIG. 1 is a perspective view of a scraper attachment for garden tractors in accordance with one preferred embodiment.
Figure 2:
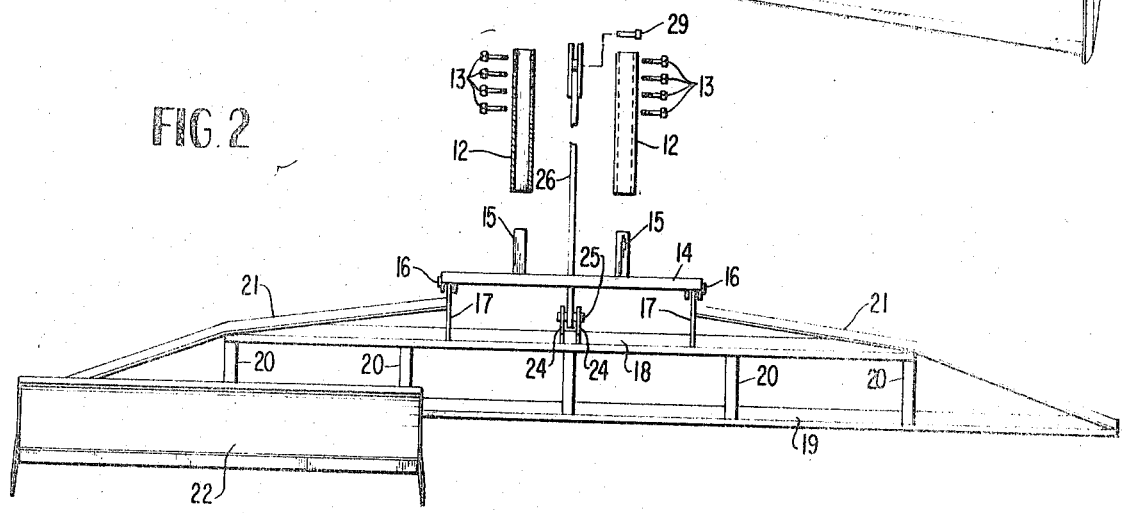
FIG. 2 is an exploded plan view of the scraper attachment, partly broken away and partly in section, with certain elements omitted.

Referring to the drawings in detail, where like reference numerals designate like parts and considering first FIGS. 1 to 4 inclusive, the numeral 10 designates a conventional garden tractor having main longitudinal rectangular box frame members 11 whose forward ends are open. A pair of rectangular tubular adapter frame bars 12 constituting parts of the attachment may be permanently socketed within the box frame members 11 so as to project forwardly thereof. The members 11 and 12 are rigidly connected in socketed relationship by a plurality of transverse bolts 13 or the like.

The scraper attachment further embodies a main transverse rigid carrier beam 14 having a pair of laterally spaced plugs or socket bars 15 rigidly secured by welding or the like to its rear side. These socket bars engage telescopically and removably in the adapter frame bars 12, FIG. 3, and require no bolting as will be further explained. The beam 14 abuts the forward ends of the bars 12 when the parts are assembled.

Pivoted to the carrier beam 14 at its ends through pivot elements 16 are vertically swingable links 17, whose forward ends are suitably rigidly connected with another sturdy transverse frame bar 18 of the attachment. Another long transverse frame bar 19 is spaced forwardly of the bar 18 and parallel thereto and rigidly interconnected therewith by plural struts 20. Additional brace members 21 are provided between the links 17 and the forward frame bars, as indicated, and the details of the implement frame structure may be varied somewhat as required for proper strength and rigidity.

Figure 3:
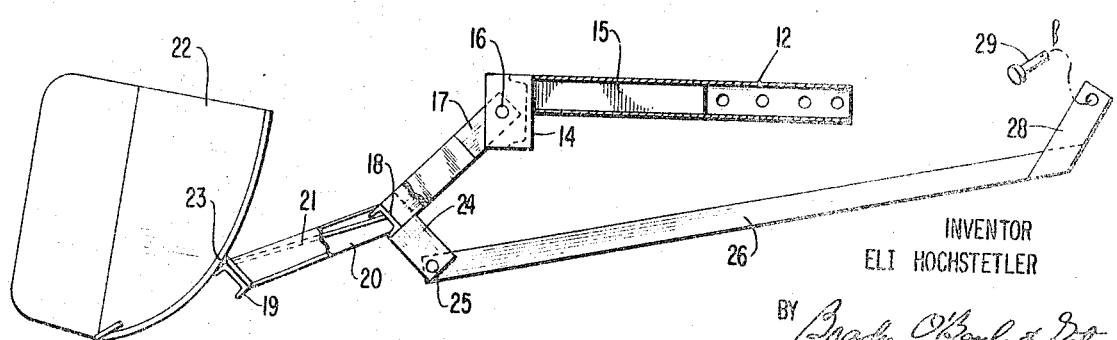
FIG. 3 is a side elevational view of the attachment, partly in section.
Figure 4:
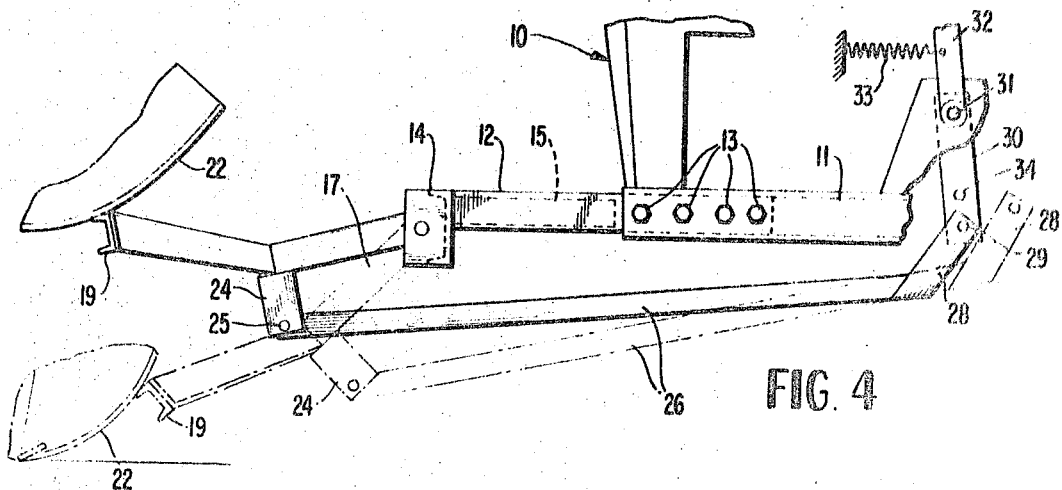
FIG. 4 is a fragmentary side elevational view of the attachment mounted on the tractor and showing two-operating positions thereof.

A pair of poultry house manure pit scraper blades 22 of generally conventional construction are rigidly secured by welding or the like to the forward frame bar 19 as indicated at 23 in FIG. 3. These scraper blades 22 are spaced-apart laterally to allow simultaneous cleaning of two pits on opposite sides of an aisle in a poultry cage house. In some cases, the blades 22 may be rendered laterally adjustable by conventional devices.

A pair of short links 24 are secured rigidly to the back of frame bar 18 and depend therefrom at an angle at the center of the frame structure, and the lower ends of these links are pivotally connected by an element 25 to a single longitudinal operating link 26 at the center of the attachment. As shown best in FIG. 4, the operating link 26 extends rearwardly below the tractor main frame to a position beneath the driver's seat 27 in ready reach of the operator. The link 26 has a rear end upturned extension 28 integral therewith pivotally connected at 29 to the existing pivoted lift arm or crank 30 of the garden tractor. The arm 30 is pivoted to the tractor structure as at 31 and the pivot shaft 31 is turned on its axis by a manual handle 32 in ready reach of the tractor driver, the lower end of the handle being rigid with the shaft 31. The handle 32 is biased forwardly by a spring 33 on the tractor so that the scraper blades will normally assume a down or active scraping position as shown in broken lines in FIG. 4. The handle 32 is pulled rearwardly by the operator against the force of spring 33 to elevate the scraper attachment, as shown in full lines in FIG. 4. When the attachment is elevated, the blades 22 are above and clear of the pits or any surface over which the tractor is moving. The sole operational connection for the scraper attachment is with the handle 32 and associated link 30 and only the single pivot pin element 29 is required to connect the entire attachment with the tractor or to disconnect it for removal bodily from the tractor. When the element 29 is disconnected, the link 26 is free and the socket bars 15 may slide freely into or out of the tubular adapter bars 12.

In this connection, the entire attachment may be propped up on the ground with the socket bars 15 at the proper elevation and the tractor is driven forwardly so that the bars 15 will enter the adapter bars 12 and the pin 29 is simply introduced into the registering openings of extension 28 and arm or crank 30 to complete the coupling up or disconnecting of the entire attachment.

Conventionally, the arm 30 has a second opening 34 for a mowing attachment, not shown, and it is not required to disconnect this mowing attachment from the tractor when the invention scraper attachment is mounted and this is optional with the user. No structural modification of the conventional tractor structure or mechanical lift linkage is required and this is an important feature of the invention which will be appreciated by anyone familiar with the art.

Figure 5:
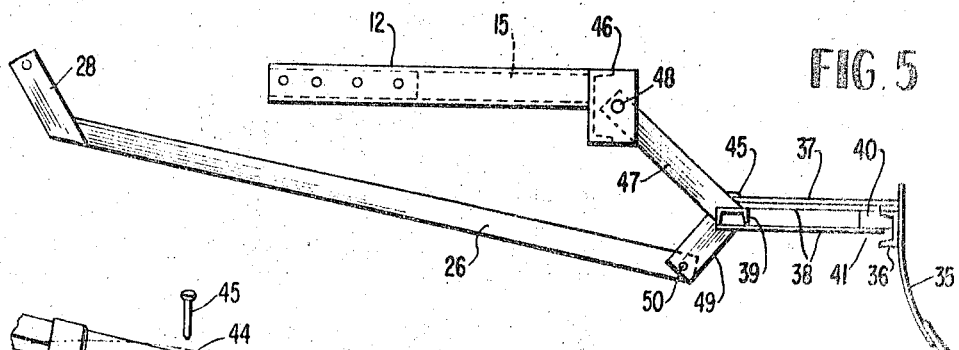
FIG. 5 is a side elevational view of a modification.
Figure 7:
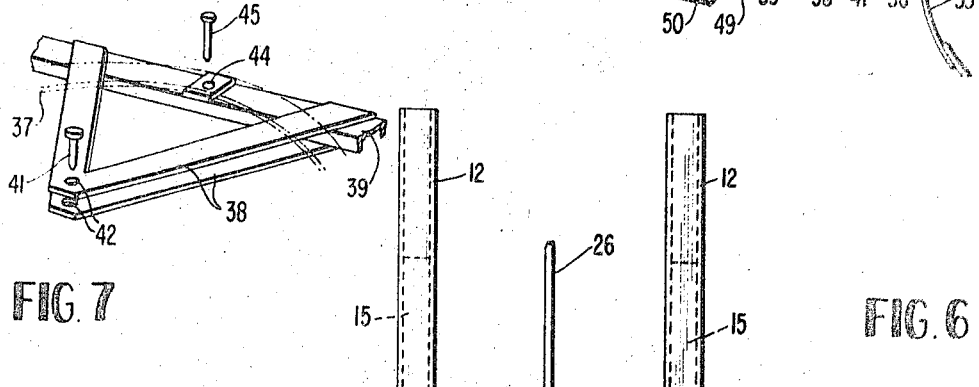
FIG. 7 is a fragmentary perspective view of a blade angle-adjusting means.
Figure 6:
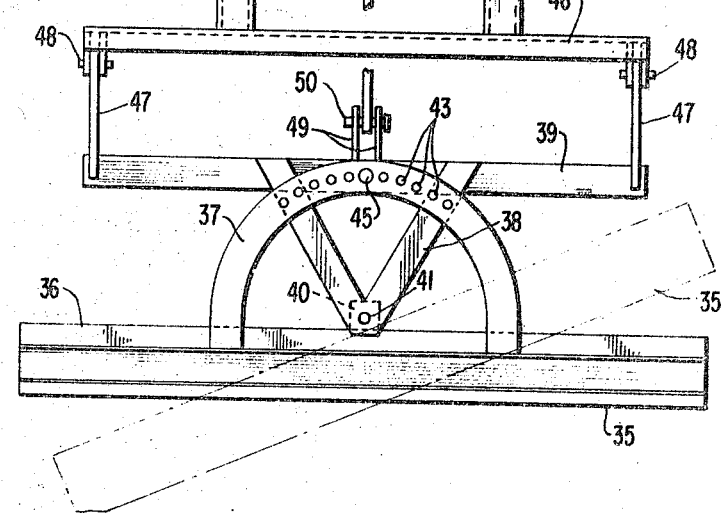
FIG. 6 is a plan view of the modified structure.

As disclosed in FIGS. 5 through 7, the invention may be embodied in a snow plow or road scraper form having a single scraper blade 35 including, near its top, a rigid backup bar 36 having rigidly secured thereto a horizontal rearwardly projecting arcuate frame 37. This arcuate frame 37 overlies a coacting two-part V-frame 38, rigid with a transverse beam 39 of the attachment. The forward end of the V-frame 38 straddles a lug 40 rigid with the bar 36 at the center thereof and a single pivot pin 41 is received through apertures 42 of the two-part V-frame and a registering aperture of the lug 40. Thus, the pin 41 serves to pivotally connect the scraper blade 35 to the V-frame 38 and rearward frame structure, to be described. The angle adjustment of the blade 35 on the axis of pivot pin 41 is rendered variable through a series of openings 43 in arc frame 37 and a single coacting opening 44 at the center of the beam 39 adapted to register with any selected opening 43 and to receive a single-locking pin 45.

The remainder of the attachment is very similar to the preceding embodiment in FIGS. 1 through 4 and comprises carrier beam 46 which corresponds to beam 14 of the preceding embodiment. The previously described tubular adapter bars 12 may be employed and these bars receive the previously described socket bars 15 projecting from the back of the beam 46 and this construction need not be dealt with in further detail in view of the previous description. Links 47 are pivoted at 48 to the ends of beam 46 and their forward ends are rigid with the beam or bar 39 which corresponds to the element 18 of the prior embodiment. Short links 49, similar to the links 24, depend rigidly from the bar 39 and have their lower ends pivoted at 50 to the forward end of the previously described operator link 26 having rear extension 28. The operator link 26 functions with the pivot element 29, arm 30 and handle 32 in the identical manner described fully in the preceding embodiment and the description of operation need not be repeated. The embodiment shown in FIGS. 5 to 7 possesses all of the advantages of the previous embodiment regarding the ease of mounting and demounting the attachment and raising and lowering the same.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. A scraper attachment for a tractor having a pair of laterally spaced tubular frame members and an implement lift lever mounted thereon, said attachment comprising a main transverse carrier beam disposed forwardly of said frame members and including a pair of laterally spaced rearwardly projecting socket elements adapted to be freely telescopically received within said tubular frame members, a blade support frame disposed forwardly of the main carrier beam and pivoted thereto for vertical swinging movement, blade means connected to said blade support frame, a single longitudinal operating link near the transverse center of the tractor and below the frame thereof and having a forward end pivoted directly to said vertically swingable blade support frame and a rear end disposed adjacent said implement lift lever, and a single-coupling element pivotally interconnecting said lift lever and said rear end of the single-operating link.

2. A scraper attachment as defined by claim 1, and a pair of tubular adapter frame bars engaging telescopically within the tubular frame members and secured rigidly therein so as to form extensions of the frame members, said socket elements engaging telescopically within the forward ends of the adapter frame bars.

3. A scraper attachment as defined by claim 1 in which said blade means comprises a pair of laterally spaced scraper blade elements on said blade support frame and said blade elements spaced substantially equidistantly from the longitudinal center line of the tractor.

4. A scraper attachment as defined by claim 1 in which said blade means comprises a single scraper blade arranged forwardly of said blade support frame and pivoted thereto near the center of the scraper blade so that the blade may pivot on a vertical pivot axis to plural angular positions, and adjustable locking means for the single scraper blade allowing the same to be releasably held in selected angularly adjusted positions.

5. A scraper attachment as defined by claim 4, and wherein said blade support frame includes a transverse beam, a forwardly projecting frame extension on said beam, a vertical axis pivot element for said single scraper blade on said extension, an arcuate frame member on the back of said scraper blade having plural circumferentially spaced adjustment openings, said beam having a coacting opening, and a locking pin engageable through said coacting opening and any selected one of said adjustment openings.

6. A scraper attachment as defined by claim 1, and a pair of laterally spaced links on said blade support frame projecting rearwardly thereof and having their rear ends pivoted to said main carrier beam and being vertically swingable relative thereto under influence of said implement lift lever.

7. A scraper attachment as defined by claim 6, and additional short-depending link means on said blade support frame pivoted directly to said single longitudinal operating link near the forward end of the latter.

8. A scraper attachment as defined by claim 7, and resilient means connected with said lift lever biasing the same in a direction to hold said blade support frame in an active down position.

9. A scraper attachment as defined by claim 2, and wherein the tubular frame members, adapter frame bars and said socket elements are coaxial and rectangular in cross section.

10. A scraper attachment as defined by claim 9, and transverse bolt means rigidly interconnecting the adapter frame bars and frame members.